United States Patent [19]

Takigawa et al.

[11] 4,332,286

[45] Jun. 1, 1982

[54] HEAVY DUTY PNEUMATIC TIRE TREAD

[75] Inventors: Hiroyoshi Takigawa, Kodaira; Nobuhiro Miyamura, Higashimurayama, both of Japan

[73] Assignee: Bridgestone Tire Company, Limited, Tokyo, Japan

[21] Appl. No.: 225,817

[22] Filed: Jan. 16, 1981

Related U.S. Application Data

[63] Continuation of Ser. No. 39,730, May 19, 1979, abandoned.

[30] Foreign Application Priority Data

May 26, 1978 [JP] Japan .................................. 53-62943

[51] Int. Cl.³ .............................................. B60C 11/06
[52] U.S. Cl. ................................................ 152/209 R
[58] Field of Search ....... 152/209 R, 209 D, 209 WT, 152/209 NT; D12/141, 142, 145

[56] References Cited

U.S. PATENT DOCUMENTS

| D. 196,224 | 9/1963 | Shesterkin et al. | D12/142 |
| D. 215,529 | 9/1968 | Jacobs et al. | D12/142 |
| 2,056,131 | 9/1936 | Brittain | 152/209 R |
| 3,411,559 | 11/1968 | Verdier | 152/209 R |
| 3,573,571 | 3/1971 | Riches | 152/209 R |
| 3,841,374 | 10/1974 | Boileau | 152/209 R |
| 3,858,633 | 1/1975 | Boileau | 152/209 R |

FOREIGN PATENT DOCUMENTS 932401  7/1963  United Kingdom ............ 156/209 R

Primary Examiner—Michael W. Ball
Attorney, Agent, or Firm—Sughrue, Mion, Zinn, Macpeak and Seas

[57] ABSTRACT

A heavy duty pneumatic tire includes a tread in a crown of a tire body reinforced by a toroidal carcass extending between a pair of annular bead cores. The tread is formed with a pair of main wide grooves circumferentially spaced apart at least one half of a tread width of the tire on both sides of a central circumferential line and a wide subgroove extending along the central circumferential line and in parallel with the main wide grooves to form first ribs bounded by the wide subgroove and the main wide grooves and second ribs bounded by the main grooves and tread edges. Each first rib is formed with a narrow groove extending circumferentially to divide the first rib into two parts. The tire according to the invention is made superior in antiskid characteristic on wet roads by improving the drainage without sacrificing the wear resistance of the tire.

5 Claims, 2 Drawing Figures

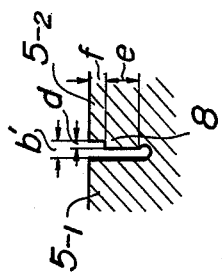
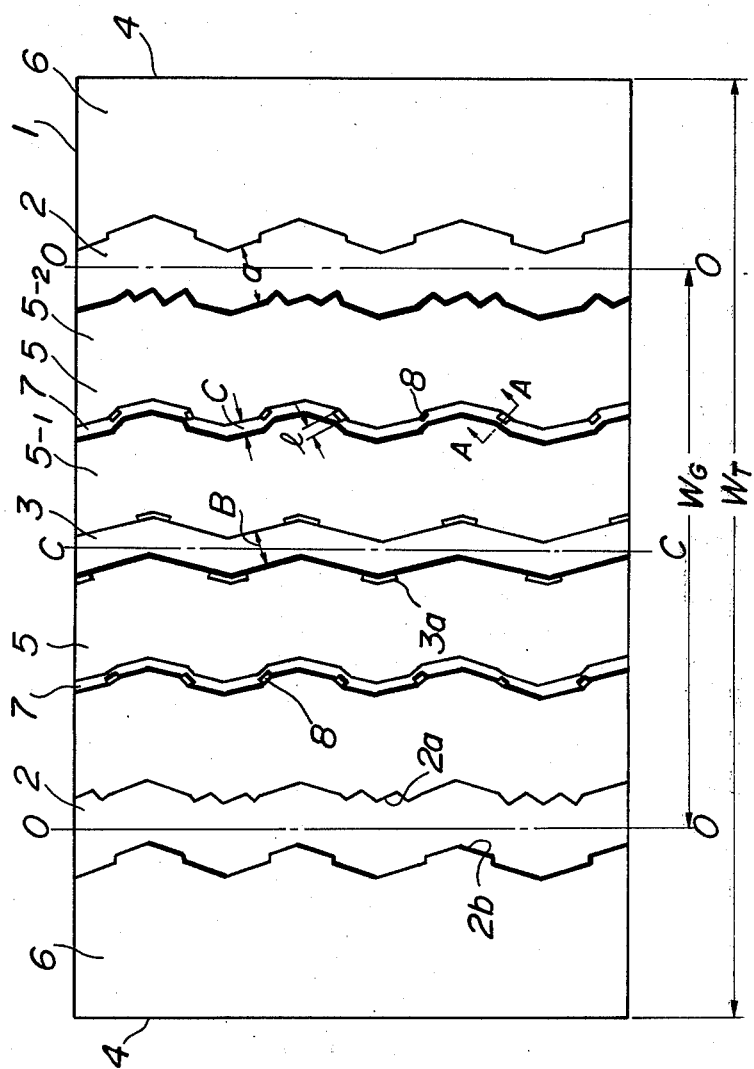

HEAVY DUTY PNEUMATIC TIRE TREAD

This is a continuation, of application Ser. No. 39,730, filed May 19, 1979, now abandoned.

BACKGROUND OF THE INVENTION

1. Field of the Invention

This invention relates to a heavy duty pneumatic tire, and more particularly a pneumatic radial tire having an improved tread for trucks, buses and the like.

2. Description of the Prior Art

Characteristics of tires required for heavy duty vehicles such as trucks and buses are, first of all, the wear resistance from the economical point of view, and second, the antiskid characteristic on wet paved roads from the viewpoint of safety.

It has been known that the wear resistance depends generally on the kinds of compounds used for the treads and on the design of the treads, particularly, the configuration and arrangement of tread patterns figures no less greatly than the kinds of compounds. On the other hand, the antiskid characteristic on a wet road depends absolutely on the design factors of the treads. The antiskid characteristic can be generally improved by increasing the percentage of grooves occupied in a tread to aid the drainage in a contact surface.

As can be seen from this explanation, the wear resistance and antiskid characteristic are contradictory. Accordingly, one of these required characteristics of tires has been unavoidably sacrificed more or less according to the application of the tires.

There have been known two general tread types, one of which is the so-called five rib type wherein four wide zigzag circumferentially endlessly continuous grooves are arranged equally spaced in the direction of the width of the tire, and the other of which is the three rib type wherein a pair of wide zigzag circumferentially continuous grooves are arranged to divide the width of the tread into three parts and the divided ribs are formed with grooves which are so narrow that they are closed when the tire is loaded.

The five rib type tread is superior in antiskid characteristic but it is inferior in wear resistance. The three rib type tread is rather inferior in antiskid characteristic. These two types thus have one merit and one demerit contradictory to each other.

SUMMARY OF THE INVENTION

It is therefore an object of the invention to provide a heavy duty pneumatic tire comprising a tread whose antiskid characteristic is effectively improved on wet roads without sacrificing the wear resistance of the tire.

To achieve this object, a heavy duty pneumatic radial tire having high drainage, including a tread in a crown of a tire body reinforced by a toroidal carcass extending between a pair of annular bead cores, comprises tread formed with a pair of main wide grooves extending circumferentially and spaced apart by at least one half of a tread width of the tire on both sides of a central circumferential line, and a wide subgroove extending along said central circumferential line and in parallel with said main wide grooves to form first ribs bounded by said wide subgroove and said main wide grooves, and second ribs bounded by said main grooves and tread edges, and said first ribs each being formed with a narrow groove circumferentially extending so as to divide the first rib into two parts.

It will be understood that the expression "wide groove" or "wide subgroove" used herein, will mean grooves formed in a tread of a tire wide enough to prevent the grooves from being closed notwithstanding the deformation of the tread rubber when the tire is loaded under a normal travelling condition.

The invention will be more fully understood by referring to the following detailed specification and claims taken in connection with the appended drawings.

BRIEF DESCRIPTION OF THE DRAWINGS

FIG. 1 is a development view of a tread of a tire illustrating one embodiment of the invention; and FIG. 2 is a sectional view taken along the line A—A in FIG. 1.

DETAILED DESCRIPTION OF THE PREFERRED EMBODIMENTS

FIG. 1 is a partial development view of a tread 1 of a heavy duty pneumatic tire according to the present invention. The tread is of course arranged circumferentially endlessly in a crown of a tire body reinforced by toroidal carcasses extending from a bead portion including an annular bead core through sidewalls and the tread to a bead portion on the opposite side, these parts other than tread being not shown in the drawing.

The tread 1 comprises a pair of main wide grooves 2 on both sides of a central circumferential line C—C of the tire, a wide subgroove 3 centrally along the central circumferential line C—C, first ribs 5 bounded by the main grooves 2 and subgroove 3 and second ribs 6 bounded by the main grooves and tread edges 4.

The positions of the main grooves 2 in the tread with respect to the direction of the width of the tread, that is, the direction of a rotating axis of the tire, are preferably determined in particularly radial tires for trucks and buses so as to be slightly outwardly of locations approximately one-fourth of the tread width $W_T$ from the tread edges where frictional forces between the tread and a road are maximum when a braking action is applied during travelling. In other words, a distance $W_G$ between central lines O—O of the main wide grooves 2 symmetrically arranged with respect to the center line C—C is preferably within the range of one half to seven tenths of the tread width $W_T$.

On the other hand, the wide subgroove 3 is arranged substantially in parallel with the main wide grooves 2 and along the central circumferential line C—C of the tread where the maximum contact pressures are produced during normal travelling.

These wide grooves may be formed in the configuration as shown in this embodiment. Groove walls defining the first and second ribs 5 and 6 are arranged in the form of polygonal lines as viewed in the plane of the pattern. The polygonal lines are opposed to and in parallel with each other and consist of straight segments oblique to the central lines O—O. One of the polygonal lines of the main wide groove 2 may be formed in vertexes projecting toward the central lines O—O with zigzag lines 2a and the other polygonal line of the main groove 2 formed in the similar vertexes with slight angular projections 2b to partially modify the polygonal lines. Polygonal lines of the wide subgroove 3 may be formed in all vertexes away from the central line C—C with notches 3a. Other various modifications of the polygonal lines may be effected in the pattern of the tire. In any case, it is preferable that the ribs are circumferentially continuous without extending beyond the central lines.

Crosssectional configurations of the wide grooves 2 and 3 taken along a radial plane including a rotating axis of the tire may be preferably U-shaped, or V-shaped as the case may be.

A width a of the main wide grooves 2, defined by the minimum distance between the basic polygonal lines, may be 2–6% of the tread width $W_T$. A width B of the wide subgroove 3 defined identically to the above may be 2–6% of the tread width $W_T$ or somewhat narrower therethan.

Relations between the first and second ribs 5 and 6 are determined by the relative positions of the main wide grooves 2 to the tread 1. It is preferable to form the first ribs 5 wider than the second ribs 6 in view of the wear resistance of the tire. However, there is a tendency of such wide first ribs to decrease the drainage of the tire. To overcome this problem, the first rib 5 is formed along its central line with a circumferentially extending narrow groove 7 substantially in parallel with the wide grooves to divide the first rib 5 into two ribs 5-1 and 5-2.

The width C of the narrow groove 7 is generally preferably 0.5–2% of the tread width $W_T$ in order to prevent the narrow groove 7 from being closed in the contact surface when the tire is being subjected to a heavy load and therefore to maintain the drainage of the tire. It is further preferable to provide in various places of the both sidewalls of the narrow groove 7 spacers 8 projecting toward the center of the groove to maintain the drainage of the tire more effectively. With this arrangement, when the ribs 5-1 and 5-2 are deformed in the contact surface, the tips of the spacers 8 will abut against or be brought into contact with the opposite sidewalls to mitigate the deformation of the narrow groove, thereby maintaining the spaces required to introduce the water about the narrow groove thereinto for removing or draining the water from the contact surface of the tire. Simultaneously, the spacers 8 serve to unite the ribs 5-1 and 5-2 to effectively prevent the decrease of the rigidity of the first rib 5 due to the narrow groove 7.

Referring to FIG. 2 illustrating the configuration and relative position of the spacer 8 in section taken along line A—A in FIG. 1, a height e of the spacer 8 in the direction of the depth of the narrow space 7 is several millimeters. In this embodiment, the spacer 8 projects a distance d from one sidewall which is approximately one half of the width b' of the narrow groove which is somewhat narrower than the width c above described. The spacers 8 are arranged two in each pitch of the narrow groove 7 in FIG. 1. Other dimensions and numbers of the spacers may be employed within the scope of the invention. For example, the spacers may be arranged staggered or opposed in both sidewalls. Instead of the spacers, the polygonal lines of the sidewalls may be circumferentially shifted so as to bring parts of the sidewalls into contact with each other when loaded to maintain the required spaces in the grooves. The second rib 6 may be formed with a similar narrow groove according to an arrangement of the main wide grooves 2. These narrow grooves may be intermittent in the circumferential direction of the tire or may be formed with branch grooves or sipes.

A comparative test of the tires above described according to the present invention and tires including three ribs of the prior art was carried out with respect to the antiskid characteristic and wear resistance.

The tires 10,00R20 14PR were used for the test, which are radial tires including a one ply carcass whose steel cords are radially arranged and a four ply steel cord laminated belt arranged on the carcass and having steel cords angularly arranged at slight angles to the circumferential direction of the tire. Dimensions of the tires according to the invention and the tires of the prior art used for the test are shown in Table 1.

TABLE 1

Comparison in dimension of the tires according to the invention and the tires of the prior art

|  |  | Tires according to the invention | Tires of the prior art |
|---|---|---|---|
|  | Number of main ribs | 4 | 3 |
| Main grooves | Ratio of distance between grooves to tread width ($WG/W_T$) | 0.6 | 0.33 |
|  | Ratio of width of groove to tread width ($a/W_T$) | 0.06 | 0.06 |
|  | Subgroove | one at center B = 8 mm | none |
| Narrow grooves | Arranged position | one in each first rib | one in each of all ribs |
|  | Ratio of width of groove to tread width ($C/W_T$) | 0.015 | 0.015 |
| Spacer | Ratio of widths of spacer and groove (d/b') | 0.5 | none |
|  | Height (e) | 7 mm |  |
|  | Length (l) | 2.5 mm |  |
|  | Position | two/pitch |  |

Tread width: 190 mm
Groove depth: all 14.5 mm

These tires were assembled on rims of 7.50 V and filled with compressed air at 7.25 kg/cm$^2$ and were installed in a truck so as to be subjected to loads of 2,425 kg by adjusting the loads on the truck. Thereafter, they were tested with respect to braking, normal circular revolution and wear resistance.

For the braking test, water was sprinkled on an asphalt paved road to form water films having 1–2 mm thickness, on which the truck ran at a speed of 80 km/hour and was stopped abruptly by braking. Distances to stoppages were measured.

For the normal revolution test, the truck ran in a circle having a radius of 30 m on an asphalt paved skid pad with the similar water film. The speed of the truck was progressively increased and the speeds when the truck body started to spin laterally were measured.

For the wear resistance test, on the tires which had travelled one hundred thousand kilometers, travelling distances per 1 mm wear of the ribs were measured as mean values.

TABLE 2

| Characteristics | Tires according to the invention | Tires of the prior art |
|---|---|---|
| Braking distance (m) | 59.2 (105) | 62.2 (100) |
| Critical speed (km/hour) | 41.5 (107) | 38.4 (100) |
| Wear resistance (km/mm) | 9950 (110) | 9050 (100) |

The numerals in the brackets in Table 2 are indexes when the values of the prior art are 100.

As can be seen from Table 1, it has been proved that the antiskid characteristic of the tires on the wet road according to the invention was improved 5–7% in comparison with the prior art. At the same time, it has been proved that the present invention achieved the great advantage in that the wear resistance of tires, which would generally be contradictory to the antiskid characteristic, was improved 10% in comparison with the prior art.

As can be seen from the above description, the present invention has accomplished the simultaneous improvement of the wear resistance and antiskid characteristic of tires without compromising either of these properties, which would otherwise be incompatible in the prior art.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a heavy duty pneumatic radial tire having high drainage including a tread in a crown of a tire body reinforced by a toroidal carcass extending between a pair of annular bead cores, the improvement comprising; said tread being formed with a pair of main wide grooves extending circumferentially on both sides of a central circumferential line; a wide subgroove extending along said central circumferential line and in parallel with said main wide grooves to form first ribs bounded by said wide subgroove and said main wide grooves and second ribs mounted by said main grooves and tread edges; said main wide grooves and said subgroove being devoid of transverse grooves; a distance between center lines of said pair of main wide grooves being approximately six-tenths of the tread width of the tire and a width of said main wide grooves being at least equal to a width of said wide subgroove; said first ribs each being formed with a single narrow groove extending circumferentially so as to divide the first rib into two substantially equal parts, said narrow groove having a substantially constant width and being circumferentially continuously zigzagging along a center line of said first rib, said narrow groove including means to bring both opposite sidewalls of the narrow groove into contact with each other intermittently in a circumferential direction in the zone load when the tire is loaded; and a width of said narrow groove being within 0.5–2.0% of the tread width of the tire.

2. A pneumatic tire as set forth in claim 1, wherein said means to bring opposite sidewalls of said narrow groove into contact comprises spacers formed in parts of at least one sidewall thereof, said spacers projecting toward center lines of the groove and having tips brought into contact with the other sidewall when the tire is loaded.

3. A pneumatic tire as set forth in claim 2, wherein said spacers are formed in both sidewalls so as to be staggered in a direction of the groove.

4. A pneumatic tire as set forth in claim 2, wherein said spacers are formed in both sidewalls so as to be in opposition to each other.

5. A pneumatic tire as set forth in claim 1, wherein said means to bring opposite sidewalls of said narrow groove into contact comprises sidewalls of said narrow zigzag groove circumferentially shifted so that said sidewalls are brought into contact with each other circumferentially intermittently when the tire is loaded.

* * * * *